April 22, 1952 S. B. PICKLES ET AL 2,593,485
LOCALIZER BEACON SYSTEM
Filed Feb. 6, 1948 2 SHEETS—SHEET 1
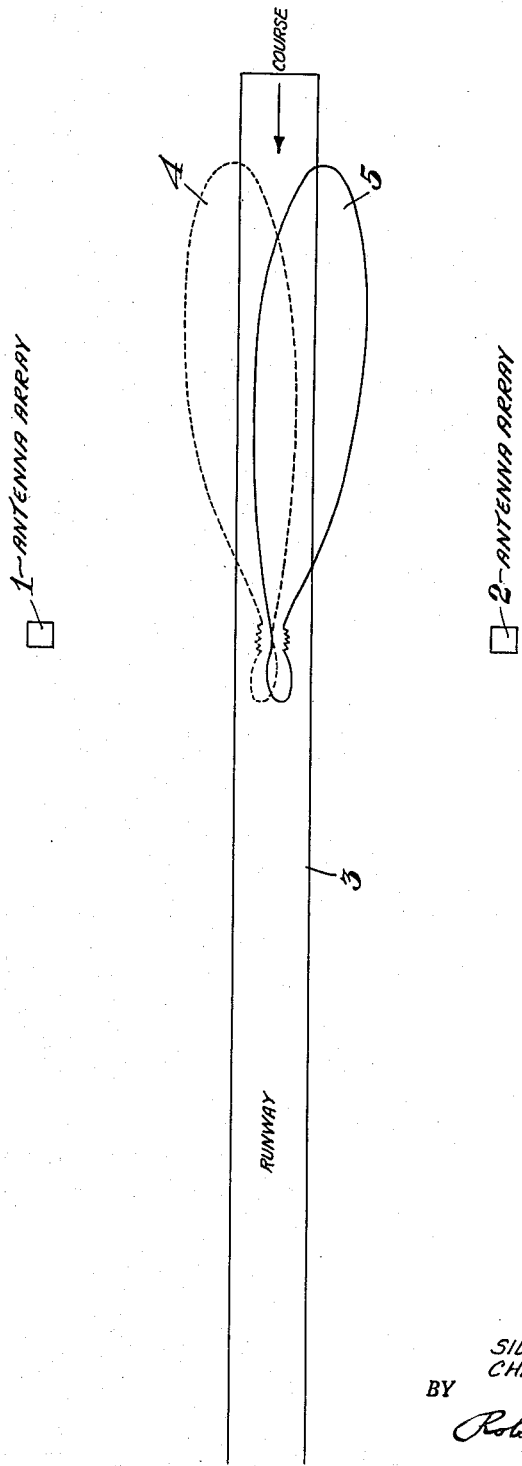
INVENTORS
SIDNEY B. PICKLES
CHESTER B. WATTS
BY
Robert Harding Jr.
ATTORNEY

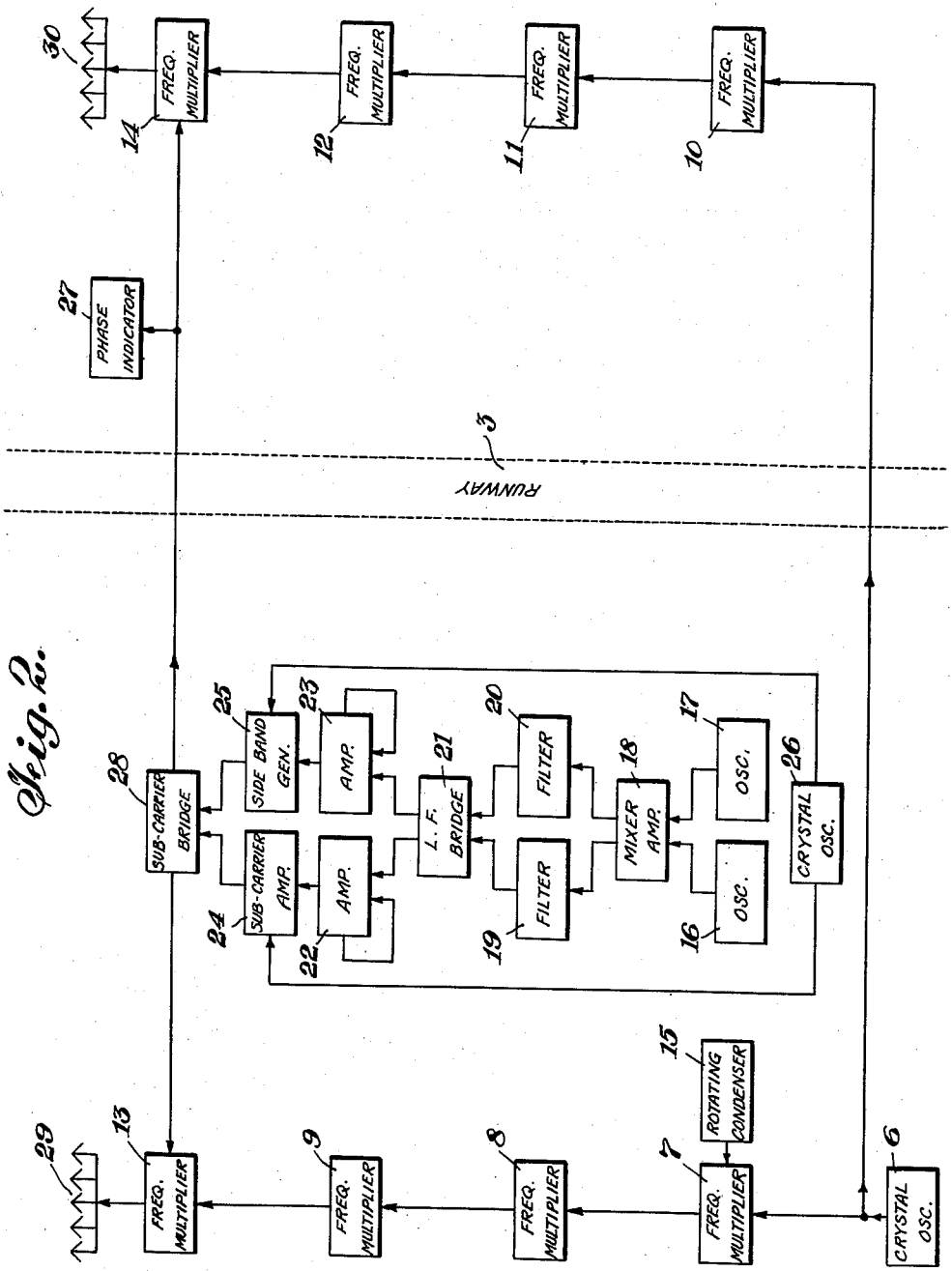

Patented Apr. 22, 1952

2,593,485

UNITED STATES PATENT OFFICE 2,593,485

LOCALIZER BEACON SYSTEM

Sidney B. Pickles, North White Plains, N. Y., and Chester B. Watts, Jr., Indianapolis, Ind., assignors to International Standard Electric Corporation, New York, N. Y., a corporation of Delaware Application February 6, 1948, Serial No. 6,638

13 Claims. (Cl. 343—107)

This invention relates to navigation systems, and more particularly to an arrangement for guiding a mobile craft relative to an electromagnetically defined energy reference zone or line.

Previous instrument landing systems of the radiant energy beam type have required that the radio beacon or localizer transmitter be installed at the far end of the runway. Present advancements in the fields of aviation require the use of longer runways and clearer approaches, which means that the single type localizer has to be located from one to two miles from the aircraft's point of contact with the runway upon landing. Under these conditions, the continued use of the previous type localizers results in indications which are not as accurate as desired, unless the localizer course is made sharper. However, as the course is made sharper, the accuracy of a course alignment with respect to the center line of the runway becomes unduly critical.

It is therefore an object of this invention to provide an improved arrangement for providing radiation patterns for the guidance of craft along a prescribed course.

In accordance with an embodiment of our invention, a localizer arrangement is divided into two units which are installed one on each side of the runway in the vicinity of the point of contact for transmitting radiant energy defining the localizer course formed by sub-carrier frequency modulation of carrier frequency waves. The spacing between the units is made a desired fraction of a wavelength at the sub-carrier frequency to produce the course guiding zone.

The above mentioned and other features and objects of this invention will become more apparent, and the invention itself, though not necessarily defined by the said features and objects, will be best understood by reference to the following description of an embodiment of the invention taken in connection with the accompanying drawings wherein:

Fig. 1 illustrates in schematic form a localizer arrangement in accordance with the present invention.

Fig. 2 shows in block diagram form a circuit arrangement for producing radiant energy patterns in accordance with the invention.

According to Fig. 1 the localizer antenna system comprises two arrays, 1 and 2, preferably horizontally polarized, located symmetrically on each side of a runway 3 near the point or region of contact of an aircraft upon landing. Preferably, the antennae are operated over a wide frequency range, as for example, between 600 and 1000 megacycles per second. Antennae operating on a frequency below 600 megacycles per second become too large in size if they are electrically efficient, while if they are aero-dynamically sound, they have to be so close to the skin of the airplane that they receive best from angles considerably above the horizontal. Also, lower frequencies more or less prevent the use of slot type antennae since the apertures required are too large. Frequencies considerably above 1,000 megacycles per second require heavier receiving equipment and introduce much greater difficulty insofar as securing crystal controlled stability is concerned.

As previously mentioned, localizer arrangements which operate from the far end of the runway suffer the disadvantage, that a very high degree of angular definition is required to accurately place the aircraft in the center of the runway. Also a very small misalignment of the course at the far end will place the course completely off the runway at the approach end. For safe routine automatic landings, it is considered that a localizer system should be able to place the aircraft in the center of the runway with a spread of not much more than 15 feet. This would call for an angular accuracy at the far end of the runway of better than .086 degree under all conditions. This is an extremely close tolerance for any radio antenna system to maintain. On the other hand, if the localizer equipment is moved closer to the point of contact, then the necessary high linear definition can be realized with a much more practical tolerance on angular accuracy.

As shown in Fig. 1 the distance of the antenna arrays 1 and 2 from the runway is not particularly critical and preferably may be between 400 and 1000 feet dependent upon the selection of the sub-carrier energy frequency. If the antennae are energized with energy of a frequency in the vicinity of 1,000 megacycles per second, the resulting radiation patterns for the antenna spacings mentioned would result in multi-null directivity patterns. However, it is desirable that the maximum energy be radiated parallel to the runway in the direction of approach in order to provide at the aircraft the maximum of direct signal, and a minimum of signal reflected from field objects in the vicinity of the ground equipment.

In accordance with the invention, the localizer course is formed not by interference of the 1000 megacycles per second energy but by interference in the receiver detector of sub-carrier energy which is impressed upon the 1000 megacycle per second energy. The separation of the two arrays is made preferably a half wavelength at the sub-carrier frequency in order to provide the desired two major lobes 4 and 5 directed down the runway as shown. Carrier signals may be supplied to the two arrays from a common source, and with carefully controlled phase relationship. The 1000 megacycles per second energy may be supplied to the two arrays from circuits of slightly different frequencies in order that no interference patterns of 1000 megacycles per second will exist. As a result of this arrangement, it is possible, as an approximation, to consider that the localizer course is formed as though the sub-carrier waves which preferably should have frequencies in the vicinity of a megacycle per second, are being radiated directly from the antennae. The sub-carrier signals thus interfere to form the total or complete side band patterns, which are characterized by different low modulation frequencies as will be explained later. The total side band type patterns are applicable only at distances from the stations large compared with the spacing between the two localizer arrays. Very close to the runway, and between the localizer arrays, the formation of the total side band patterns approximate a family of hyperbolas. Each hyperbola represents, of course, a given difference in the phases of the sub-carrier signals received from the two transmitting arrays. As a result of this hyperbolic characteristic, the course will have nearly straight sides in the critical region close to the point of contact rather than coming to the apex of a sharp pointed V, common to standard localizers. This is a most desirable characteristic for both human and automatic pilots. Since the 1000 megacycle per second arrays may produce patterns having a strong forward lobe, with relatively little radiation to the sides and rear, the signals are received at a maximum distance in the approach direction. However, sufficient signals are radiated in all other directions to provide proper indications in an aircraft circling the field at a radius of substantially two miles.

The components of the transmitter proper, as shown in Fig. 2, comprise a crystal oscillator 6 which is used to insure the frequency stability of the 1000 megacycle per second carrier frequency. Two chains of harmonic multipliers 7, 8 and 9 and 10, 11 and 12, both controlled by the crystal oscillator 6 are used to feed the final 1000 megacycle multipliers such as 13 and 14, respectively. In order to prevent the formation of a 1000 megacycle interference pattern from the two transmitters, an arrangement, such as a rotating condenser 15 is applied across a frequency determining circuit of the frequency multiplier 7 in one of the chains. This condenser is made sufficiently large to produce a slight shift in phase with no appreciable detuning effect. This phase shift is carried through the multiplier chain and results in a continuously changing phase between the two 1000 megacycle outputs, thereby prohibiting the formation of a 1000 megacycle interference pattern.

As mentioned previously, separate modulation frequencies such as $f1$ and $f2$, are impressed on the sub-carriers to identify each of the side band patterns. For course stability, the relative values of $f1$ and $f2$ should be maintained constant. This may be achieved by providing, for example, two R-C oscillators 16 and 17 so chosen so that the difference in frequency of their waves will be equal to $f1$ and their sum to $f2$. The R-C oscillator outputs are mixed in the mixer circuit 18 and amplified. The mixing action produces components of $f1$ and $f2$ which are separated in filter circuits 19 and 20 and adjusted to be equal by suitable means such as a loss network in one filter. If the level of either of the R-C oscillator changes, it will produce equal variations in the magnitudes of $f1$ and $f2$ with no resultant course shift.

The modulating frequency outputs $f1$ and $f2$ are fed into opposite terminals of a low frequency bridge 21. This bridge may consist of a hybrid coil or its electrical equivalent. Amplifier-modulators 22 and 23 are connected to the output terminals of the low frequency bridge to amplify the mixed modulating frequencies. Amplifier-modulator 22 will receive equal magnitudes of $f1$ and $f2$, both in their original phases. The amplified signal then modulates the sub-carrier amplifier 24. Amplifier modulator 23 on the other hand receives equal magnitudes of $f1$, but $f2$ reversed from its original phase, which signal is then used to modulate the sub-carrier side band generator 25. Both the sub-carrier amplifier and the side band generator are excited by the common crystal controlled sub-carrier frequency source 26. The tank circuit in the sub-carrier amplifier 24 and side band generator 25 are detuned sufficiently to produce a 45 degree phase shift in opposite directions. This 45 degree phase shift may be either leading in the amplifier and lagging in the side band generator or vice versa. The resultant 90 phase degree displacement between the two outputs may be achieved by other means, such as for example, by inserting a 90 degree delay line in one of the outputs. The 90 degree phase relationship in all cases may be monitored by the phase indicator 27. The phase indicator 27 may consist of a detector and a conventional comparator circuit operating to indicate proper phasing to provide equal magnitudes of the frequencies $f1$ and $f2$. In order to maintain the percentages of modulation nearly constant and to prevent over-modulation, both the amplifier 24 and side band generator 25 may be equipped with automatic volumn control. In addition, the sub-carrier amplifier and the sub-carrier side band generator may be equipped with negative feedback circuits or other electronic means for accurately stabilizing their outputs.

The outputs of the circuits 24 and 25 are applied to opposite terminals of a sub-carrier bridge 28. The sub-carrier bridge 28 combines the $f1$ and $f2$ modulated sub-carrier and sub-carrier side band energy and applies the resultant energy to modulate the frequency multipliers 13 and 14. A reversal is included in one arm of the sub-carrier bridge 28 so that energy from the sub-carrier side band generator is delivered to the two sides out of phase, while energy from the modulated sub-carrier amplifier 24 is delivered in phase. This produces the sub-carrier modulated localizer pattern already discussed wherein antennae 29 and 30 transmit equal amounts of carrier, sub-carrier, and sub-carrier side band energy. Upon subsequent reception in a mobile craft, the sub-carrier frequency may be recovered as if it were directly radiated by the carrier stages, instead of being transmitted in the form of side band energy. All of the sub-carrier frequencies cary with them the $f1$ and $f2$ side bands which may be detected in the receiver and used to operate a course indicator.

While we have described above the principles of our invention in connection with specific apparatus (and particular modifications thereof), it is to be clearly understood that this description is made only by way of example and not as a limitation on the scope of our invention.

We claim:

1. A radio beacon for guiding a craft along a given course comprising first and second radiators each mounted on opposite sides of said course on a line normal thereto, a source of carrier radio frequency energy, a source of sub-carrier radio frequency energy, said radiators being spaced apart a plurality of wavelengths at said carrier frequency and a fraction of a wavelength at said sub-carrier frequency, means for modulating said carrier energy with said sub-carrier energy, means for applying the sub-carrier modulated carrier frequency energy of different phase to each of said radiators, whereby there is produced an energy pattern effectively defining said course, a source of low frequency energy, and means for further modulating the energy supplied to said first and second radiators with said low frequency energy.

2. An arrangement as set forth in claim 1, wherein said carrier frequency energy source comprises two outputs, means for separately modulating each of said outputs with said sub-carrier frequency energy before application to respective radiators.

3. An arrangement as set forth in claim 2, further comprising means for causing the frequency of one of the carrier energy outputs to differ incrementally from the frequency at said other output before modulation by said sub-carrier frequency energy.

4. An arrangement as set forth in claim 3, wherein said means for further modulating comprises means for modulating said sub-carrier frequency energy with said low frequency energy.

5. An arrangement as set forth in claim 4, wherein said low frequency energy comprises energy of a first and second distinct frequency, said sub-carrier frequency energy source comprising two outputs, means for separately modulating each of said sub-carrier frequency outputs with both of said low frequency waves of given phase, and means for separately modulating separate ones of said carrier frequency outputs with separate ones of said modulated sub-carrier frequency outputs.

6. An arrangement as set forth in claim 5 further comprising means for providing a phase displacement between each of said modulated sub-carrier outputs before application to respective radiators to provide said sub-carrier modulated carrier frequency energy of different phase.

7. An arrangement as set forth in claim 6 wherein said phase displacement comprises a 90° phase displacement.

8. An arrangement as set forth in claim 7, wherein said means for modulating said sub-carrier frequency output comprises means for modulating one of said sub-carrier frequency outputs with a first and second low frequency wave of a given phase, and means for modulating the other sub-carrier frequency output with a first low frequency wave and with a second low frequency wave reversed from its given phase.

9. An arrangement as set forth in claim 8, wherein one of said sub-carrier frequency outputs comprises a sub-carrier frequency amplifier, and the other sub-carrier frequency output comprises a sub-carrier side band generator.

10. An arrangement as set forth in claim 9, wherein said means for modulating said carrier frequency energy comprises means for combining said sub-carrier frequency amplifier output and said sub-carrier side band generator output in their original phase for modulating one of said carrier frequency outputs, and means for combining said sub-carrier amplifier frequency output and said sub-carrier side band generator output reversed from its original phase for modulating the other of said carrier frequency energy outputs.

11. A radio beacon for guiding a craft along a course corresponding to a landing runway comprising first and second radiator means mounted on opposite sides of said course at points substantially opposite the normal point of contact for landing craft, said radiator means being spaced apart a plurality of wavelengths at a principal operating radio frequency, and a fraction of a wavelength at a second radio frequency, sources of distinctive low frequency signals, and means for applying separate portions of energy at said principal operating frequency modulated with said second frequency and distinguished by said distinctive low frequency to each of said radiator means to produce an energy pattern effective in a receiver to produce a course signal indication.

12. A radio beacon for guiding a craft along a course comprising first and second radiators mounted on opposite sides of said course, said radiators being spaced apart a plurality of wavelengths at the principal operating radio frequency, means for supplying energy at said principal operating frequency to said first and second radio radiators, a source of energy having a second frequency such that the spacing of the radiators represents a fraction of a wavelength at that frequency, means for separately modulating the energy supplied said first and second radiators with energy of said second frequency of opposite phase, a source of separate distinctive low frequency signals, and means for further modulating the energy supplied said first and second radiators with said distinctive low frequency signals, whereby there is produced a modulated high frequency energy pattern effective in a receiver to produce a course signal indication.

13. A radio beacon for guiding a craft along a course corresponding to a landing runway comprising first and second radiators mounted on opposite sides of said runway at points substantially opposite the normal point of contact for landing craft, said radiators being spaced apart a large number of wavelengths at the principal operating radio frequency, a source for supplying energy at said principal operating frequency coupled to said first and second radiators, means at said second radiator for causing the supplied energy thereat to differ in frequency incrementally from the frequency at said first radiator, a source of energy having a second radio frequency such that the spacing of the radiators represents a fraction of a wavelength at that frequency, means for separately modulating the energy supplied said first and second radiators with energy of said second frequency of opposite phase, a source of distinctive low frequency signals, and means for further modulating the energy supplied said first and second radiators with said distinctive low frequency signals, whereby there is produced a modulated high frequency energy pattern effective in a receiver to produce a course signal indication.

SIDNEY B. PICKLES.
CHESTER B. WATTS, Jr.

REFERENCES CITED

The following references are of record in the file of this patent:

UNITED STATES PATENTS

| Number | Name | Date |
| --- | --- | --- |
| 1,942,262 | Shanklin | Jan. 2, 1934 |
| 2,144,203 | Shanklin | Jan. 17, 1939 |
| 2,288,815 | Luck | July 7, 1942 |
| 2,289,899 | Bond | July 14, 1942 |
| 2,433,351 | Earp | Dec. 30, 1947 |

FOREIGN PATENTS

| Number | Country | Date |
| --- | --- | --- |
| 456,838 | Great Britain | Nov. 11, 1936 |